T. M. EDGAR.
Improvement in Corn Planters.
No. 120,424.
Patented Oct. 31, 1871.
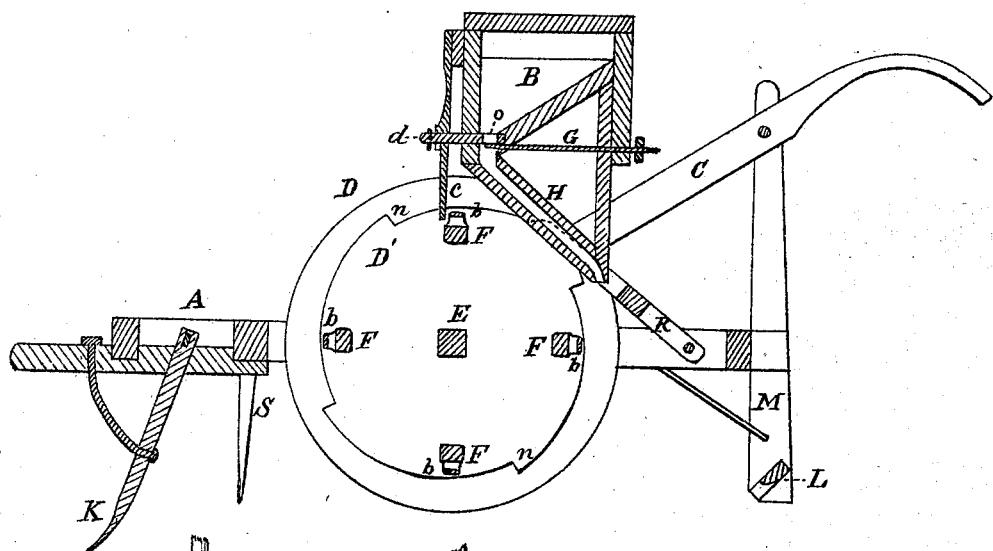
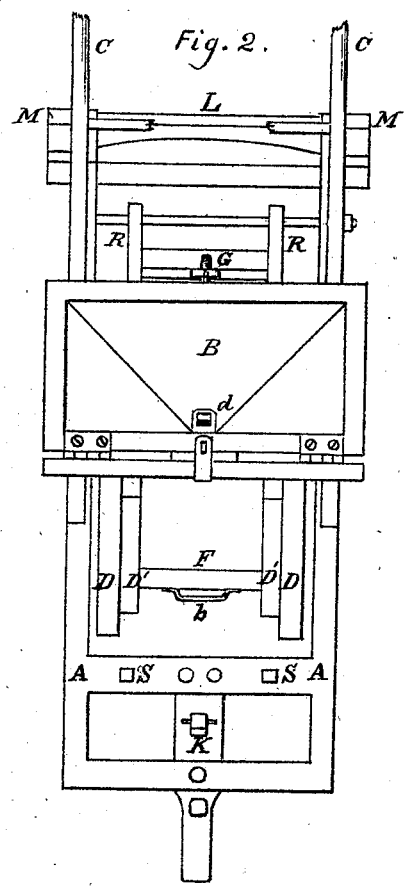
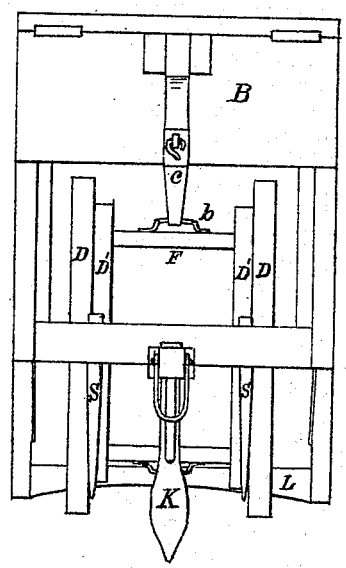
Witnesses.
H. A. Daniels
Jas. H. Lowndes
Inventor.
T. M. Edgar
By N. Purvis
Attorney

UNITED STATES PATENT OFFICE.

THOMAS M. EDGAR, OF PARIS, TENNESSEE.

IMPROVEMENT IN CORN-PLANTERS.

Specification forming part of Letters Patent No. 120,424, dated October 31, 1871.

*To all whom it may concern:*

Be it known that I, THOMAS M. EDGAR, of Paris, in the county of Henry and State of Tennessee, have invented an Improved Corn-Planter, which is fully described and set forth in the following specification and accompanying drawing, in which like letters represent like parts—

Figure 1 representing a longitudinal vertical section; Fig. 2, a top view; and Fig. 3, a front view.

My invention relates to wheel planters.

Two plain wheels are arranged on the same axle and connected by arms, which are provided with removable metallic bars arranged to strike the end of a spring as the wheels revolve, which operates the feed-slide in the bottom of the hopper. Fenders are arranged in front of the wheels to remove the clods and rubbish that would cause irregularity in the distances of the hills. A plow is arranged in front to open the furrow for the grain, and a spout connects with the hopper for conducting the grain into the furrow, and the grain is covered by a concave beam arranged in the rear of the spout. A plate provided with a thumb-screw is arranged in the bottom of the hopper to regulate the feed of the grain, and a ratchet in the rear of the wheels to prevent them from revolving backward, thus protecting the feed-spring. Frame A, hopper B, and handles C are made in the usual manner. D D represent wheels, each made of two plates, the inner plate D' being fastened by pins, screws, or rivets to the inside of the wheels. Both wheels are securely fastened on the same shaft E, the ends of which are provided with journals having their bearings on the side beams of the frame A. F are arms, the ends of which extend through and are securely fastened in the wheels to hold them firmly in proper position, and have attached, on the outside, metallic removable bars $b$, made and arranged so as to engage the lower end of the spring-lever $c$, to which is attached the feed-slide $d$, which is operated by the revolving of the wheels. (See Figs. 1 and 3 of the drawing.) The required space between the hills is secured and varied by the number of arms and bars employed, and the bars are made to be screwed or bolted upon the arms so as to be readily removable for the purpose of changing the distance between the hills, as may be required. The quantity of grain deposited in each hill is regulated by means of the feed-gauge plate G, provided with a screw and nut, arranged at the bottom of the hopper, so that the forward end extends under the orifice O in the feed-slide. The plate is drawn back to increase, and moved forward to lessen, the feed of the grain. (See Fig. 1.) The spout H is arranged so as to receive the grain as it passes through the feed-slide and to conduct it into the furrow formed by the plow K attached to the front of the frame. The grain is covered by a concave beam, L, attached to the stands M M in the rear of the wheels, shown in each of the figures of the drawing. R R is a double ratchet, arranged in the rear of the wheels so as to engage the shoulders $n$ in plate D', to prevent the wheels from revolving backward to prevent injury to the spring-lever $c$ by the bars $b$. S S are fenders, attached to frame A in front of the wheels, to remove clods and rubbish out of their way, to secure regularity in the distances of the hills.

I claim—

In a grain-planter having two wheels, D D, connecting-arms F, and removable bars $b$, the spring-lever $c$, feed-slide $d$, feed-gauge plate G, spout H, hopper B, plow K, concave coverer L, double ratchet R R, and fenders S S, all as constructed, arranged, and combined substantially as described.

In attestation of the foregoing specification of my improved corn-planter I hereunto subscribe my name this 7th day of August, 1871.

T. M. EDGAR.

Witnesses:
R. N. McFARLAND,
J. W. AYCOCK.